United States Patent
You et al.

(10) Patent No.: US 6,891,718 B2
(45) Date of Patent: May 10, 2005

(54) STRUCTURE FOR ASSEMBLING FLAT DISPLAY

(75) Inventors: Dong Jae You, Kyongsangbuk-do (KR); Myong Gi Jang, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/987,390

(22) Filed: Nov. 14, 2001

(65) Prior Publication Data

US 2002/0181188 A1 Dec. 5, 2002

(30) Foreign Application Priority Data

May 29, 2001 (KR) .................................. P2001-29778

(51) Int. Cl.[7] .............................................. G06F 1/16
(52) U.S. Cl. .................... 361/681; 248/917; 364/708.1; 439/31
(58) Field of Search ................................ 361/680–686, 361/724–727; 248/917–924; 364/708.1; 439/23, 25, 28, 31

(56) References Cited

U.S. PATENT DOCUMENTS

| | | | | |
|---|---|---|---|---|
| 6,104,605 A | * | 8/2000 | Lee | ........................... 361/681 |
| 6,411,501 B1 | * | 6/2002 | Cho et al. | .................... 361/681 |
| 6,411,504 B2 | * | 6/2002 | Howell et al. | ............... 361/683 |
| 6,421,231 B1 | * | 7/2002 | Jung | .......................... 361/681 |

FOREIGN PATENT DOCUMENTS

| | | |
|---|---|---|
| CN | 2440242 Y | 7/2001 |
| JP | H2-44718 | 3/1990 |
| JP | 10-319864 | 12/1998 |
| JP | 2000-305068 | 12/2000 |
| KR | 2000-0031979 | 6/2000 |

* cited by examiner

Primary Examiner—Hung Van Duong
(74) Attorney, Agent, or Firm—Morgan, Lewis & Bockius LLP

(57) ABSTRACT

A structure for assembling a flat display having a flat display module for displaying images with a case for fitting the flat display module therein includes a plurality of joining parts formed at a rear surface of the flat display module; and a plurality of conformable joining parts formed in the case in conformity with the joining parts of the flat display module, the plurality of conformable joining parts being engaged with the plurality of joining parts in a fit manner.

17 Claims, 3 Drawing Sheets

STRUCTURE FOR ASSEMBLING FLAT DISPLAY

This application claims the benefit of Korean Patent Application No. P2001-29778, filed in Korea on May 29, 2001, which is hereby incorporated by reference.

BACKGROUND OF THE INVENTION

1. Field of the Invention

The present invention relates to a flat display, and more particularly, to a structure for assembling a flat display for use in a portable computer or the like.

2. Description of the Related Art

There are different types of flat display available in the art. Among others, liquid crystal displays (LCDs), plasma display panels (PDPs), and field emission displays (FEDs) are popular. Recently because these flat displays have an excellent visual perception, as compared to cathode-ray tubes (CRTs), consume much less power than the CRT of the same size, and produces significantly less heat, these devices have been drawing particular attention as next generation displays for cellular phones, monitors of computers, and TV receivers. The flat displays are essential for fabricating smaller, lighter display systems, not only for application to portable computers, such as notebook computers, but also for applications to monitors of desktop computers, PDAs, and cellular phones.

FIG. 1 illustrates a portable computer having an LCD as such a flat display device. This portable computer includes an LCD 2 having a rear cover 3. The LCD 2 is rotatably coupled to a main body 1 of the portable computer having an input devices, memories, and other parts. An LCD module 4 is fitted inside of the rear cover 3 by fastening means, such as screws. The LCD module 4 includes a liquid crystal panel for displaying a desired image, and a backlight assembly for providing light to the liquid crystal panel. A front bezel 5 is mounted on the front surface of the LCD module 4.

However, in the above-described related art LCD and in other existing related art LCDs for portable computers or the like, the LCD module 4 is mounted on the rear cover via fastening means, such as screws inserted into the LCD module 4 through sides of the rear cover, or through the front face of the front bezel. Thus, the process of assembling (or disassembling for repair) of the LCD is cumbersome. Further, because very small screws (the fastening means) are typically used in the related art devices, the screws are easily lost. Moreover, reinforcing members are required in the related art LCD module 4 to support the screw engagement, resulting in an increased total weight and size of the LCD.

SUMMARY OF THE INVENTION

Accordingly, the present invention is directed to a structure for assembling a flat display that substantially obviates one or more of the problems due to limitations and disadvantages of the related art.

An object of the present invention is to provide a simpler assembly structure for flat displays, such as LCDs, that provides ease in assembly and disassembly as well as to provide lighter and thinner displays.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides, according to one aspect, a structure for assembling a flat display having a flat display module for displaying images and a case for fitting the flat display module thereto, the structure including a plurality of joining parts formed at a rear surface of the flat display module, and a plurality of conformable joining parts formed at the case in conformity with the joining parts at the flat display module according to a fit system.

The joining part at the flat display module may have a form of a recess, and the conformable joining part at the case may have a form of a protrusion to be inserted into and fit to the recess.

The joining part at the flat display module may have a form of a recess formed along the side surfaces of the flat display module, and the conformable joining part at the case has a form of a hook engaged with the recess.

In another aspect, the present invention provides a structure for assembling a flat display having a flat display module for displaying images with a case for fitting the flat display module therein, the structure including a plurality of joining parts formed at a rear surface of the flat display module; and a plurality of conformable joining parts formed in the case in conformity with the joining parts of the flat display module, the plurality of conformable joining parts being engaged with the plurality of joining parts in a fit manner.

In another aspect, the present invention provides a flat display device, including a flat display module for displaying images, the flat display module including a plurality of first joining parts formed at its rear surface; and a case that houses the flat display module, the case having a plurality of second joining parts engaged with the first joint parts to secure the flat display module to the case, the first joining parts and the second joining parts being configured to enable repeated attachment and detachment of the flat display module relative to the case in the absence of threaded engagement.

In a further aspect, the present invention provides a flat display device, including a flat display module for displaying images, the flat display module including a plurality of first joining parts; and a case having a plurality of second joining parts for housing the flat display module, the second joining parts being in frictional engagement with the corresponding first joint parts of the flat display module, enabling repeated attachment and detachment of the flat display module relative to the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the embodiments of the present invention, examples of which are illustrated in the accompanying drawings. In these embodiments, the present invention is applied to the case of an LCD in a portable computer. However, the present invention is not limited to such applications.

Figure 1:
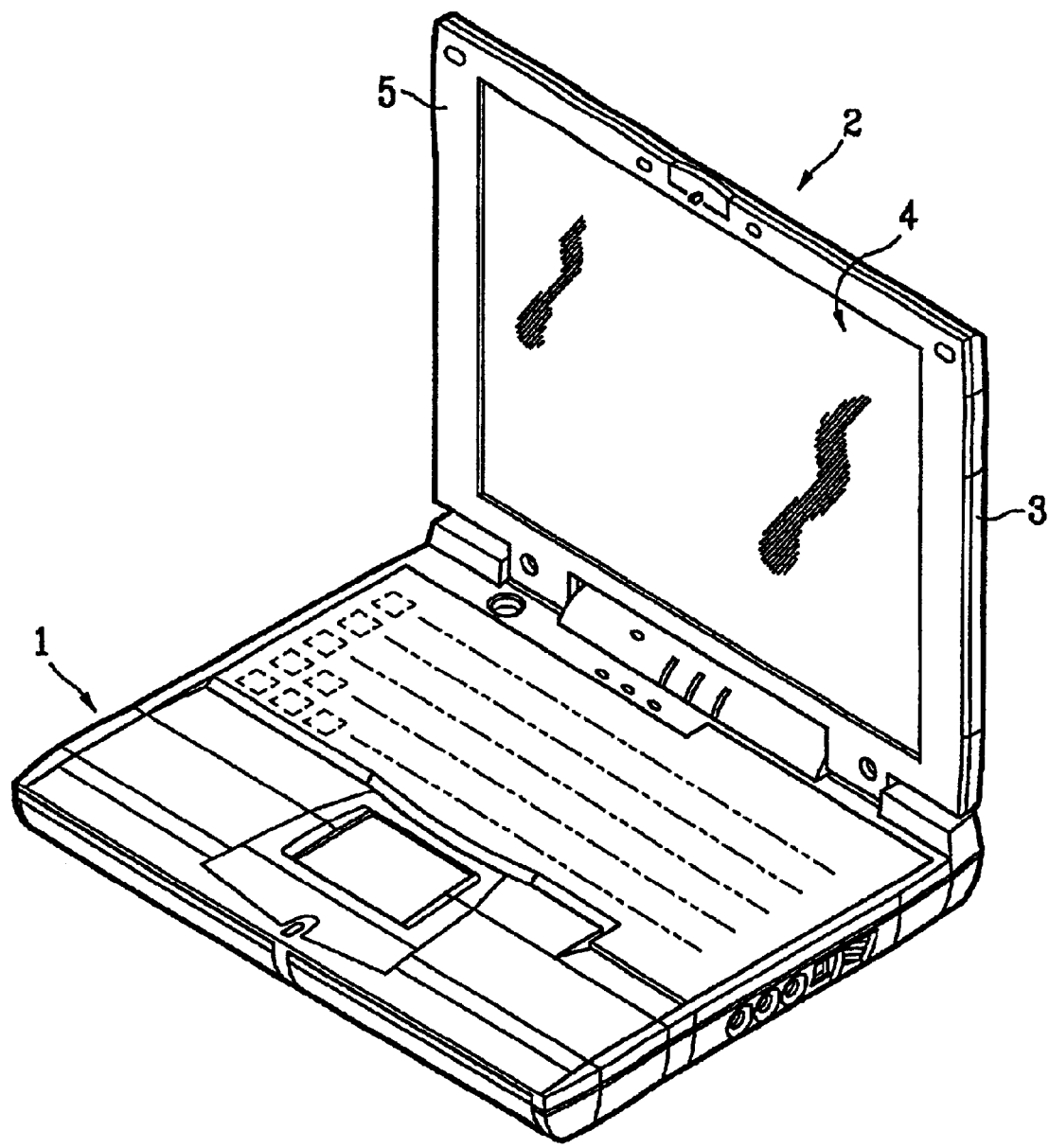
FIG. 1 is a perspective view of a related art portable computer.
Figure 2:
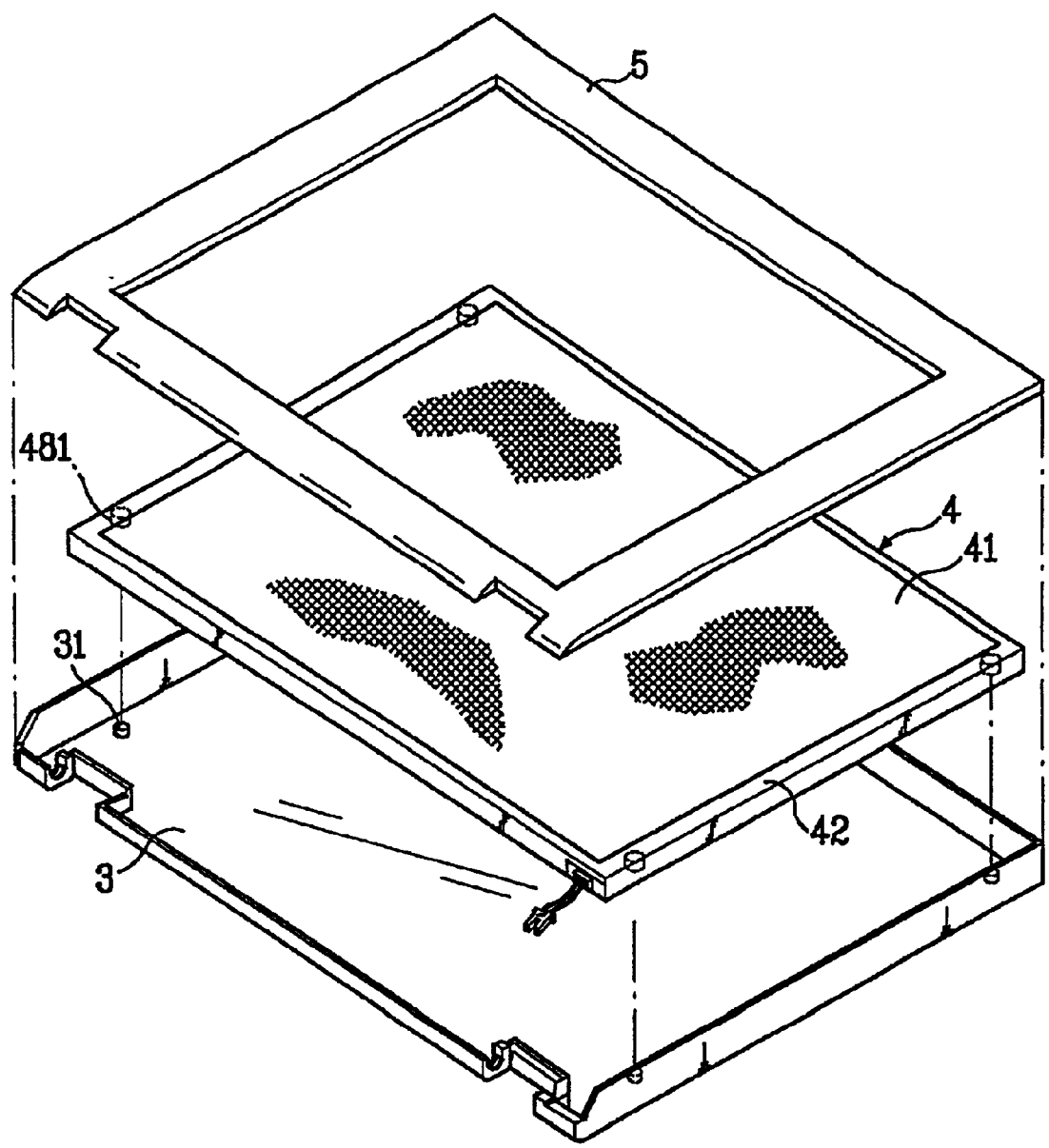
FIG. 2 is a perspective view of a display of a portable computer having a structure for assembling a flat display according to a first embodiment of the present invention in a disassembled condition.
Figure 3:
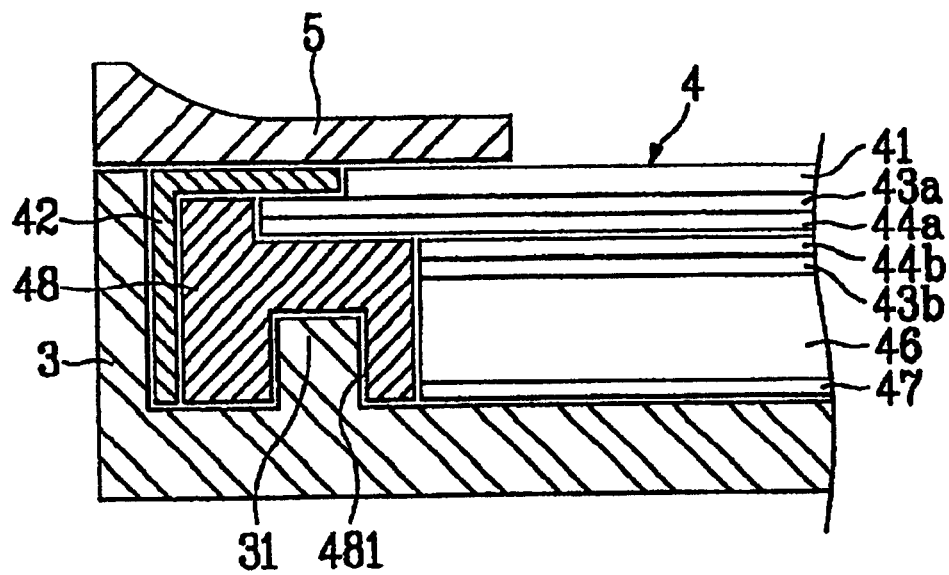
FIG. 3 is a section view of a peripheral part of the structure of the first embodimetn of FIG. 2.

FIGS. 2 and 3 illustrate an LCD in a portable computer having a structure for assembling a flat display according to a first embodiment of the present invention. A rear cover 3 is made of plastic, for example, and is configured to have a hinge coupled to the rear part of a portable computer that has memories, circuits, and an input keyboard, etc., such as shown in FIG. 1. An LCD module 4 is for displaying images, and is attached to the rear cover 3. A front bezel 5 made of plastic, for example, is fitted along the front edges of the rear cover 3 to cover a rim of the LCD module 4.

Referring to FIG. 3, an example of the LCD module 4 including the following structures: a liquid crystal panel 41 for displaying images; diffusion sheets 43a and 43b, prism sheets 44a and 44b, a light guiding plate 46, a reflective sheet 47, a lamp (not shown), and a rectangular plastic mold frame 48 for supporting these various components. These components other than the liquid crystal display panel 41 may be collectively referred to as "blacklight assembly," and are provided to guide light to the liquid crystal panel 41. The LCD module 4 further includes a metal sash 42 for fixing both liquid crystal panel 41 and mold frame 48 of the backlight assembly together.

In this example, the LCD module 4 and the rear cover 3 are assembled using a fit system, in which a fit hole 481 is bored adjacent each corner of the mold frame 48 at the rear side of the LCD module 4, and fit protrusions 31 are formed on the rear cover 3 at the positions corresponding to the respective fit holes 481 to be inserted in the fit holes 481.

Accordingly, in assembly of the LCD module 4 with the rear cover 3, the fit holes 481 in the LCD module 4 are aligned with the corresponding fit protrusions 31 on the rear cover 3, and the LCD module 4 is pressed from above, so that the LCD module 4 and the rear cover 3 are assembled together by simply engaging the fit protrusions 31 with the fit holes 481.

Figure 4:
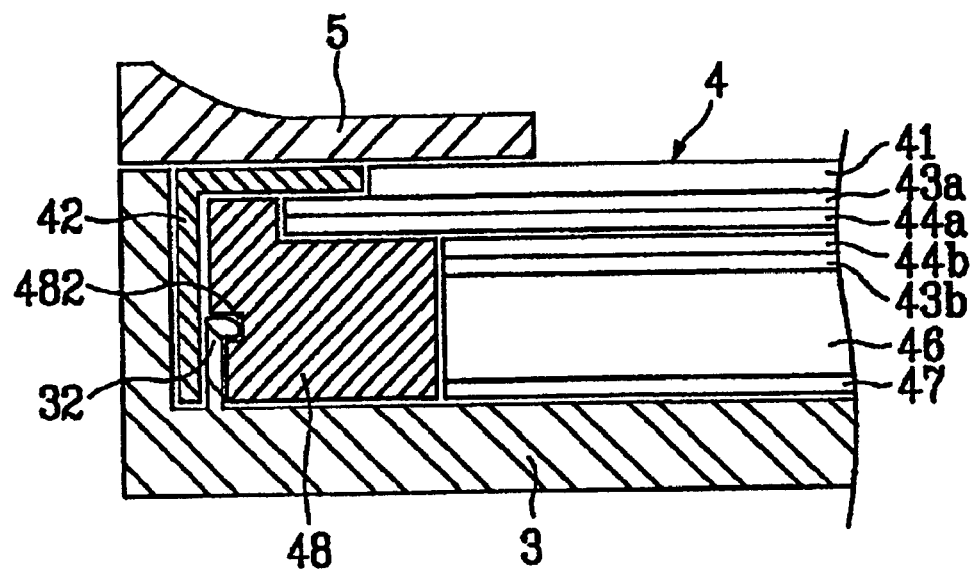
FIG. 4 is a section view of a peripheral part of a display of a portable computer according to a second embodiment of the present invention.

FIG. 4 is a section view of a peripheral portion of a display part of a portable computer having a structure for assembling a flat display according to a second embodiment of the present invention. A plurality of recesses 482 is formed at the respective sides of a mold frame 48 of the LCD module 4, and a plurality of hooks 32 is integrally formed on the rear cover 3 to be engaged with the recesses 482 in the mold frame 48.

In this embodiment, the LCD module 4 and the rear cover 3 are assembled, as follows. The recesses 482 in the LCD module 4 and the hooks 32 on the rear cover 3 are aligned, and the LCD module 4 is pressed down from above to insert the hooks 32 into the corresponding recesses 482, thereby assembling the LCD module 4 and the rear cover 3.

As explained above, because the structure for assembling a flat display of the present invention enables simple assembly of a flat display module and a case by use of a fit system, the assembly is easy, and the additional reinforcing members used in the related art screw fastening structure are no longer required, providing a display device having a reduced total weight and dimensions.

It will be apparent to those skilled in the art that various modifications and variations can be made in the structure for assembling a flat display of the present invention without departing from the spirit or scope of the invention. Thus, it is intended that the present invention cover the modifications and variations of this invention provided they come within the scope of the appended claims and their equivalents.

For example, it is apparent to one of ordinary skill in the art that various structures other than the above-disclosed examples are possible in assembling an LCD display, such as in assembly of the LCD module 4 and the rear cover 3, in a fit system. For example, the hook 32 on the rear cover 3 may take a mushroom-like shape, and the recess in the LCD module 4 may be shaped in conformity with the shape of such a hook. Also, it is apparent that the assembly structure of the present invention is also applicable for securing a front frame (or front bezel 5) to the rear cover 3 and/or the display module 4. Both the front frame and the rear cover may be attached to the display module by the use of the present invention, for example. Further, while the above embodiments are described in the case of installing an LCD in portable computers, such as notebook computers and laptop computers, the present invention is also applicable to other types of flat display, such as PDP and FED in the same or similar fashion.

What is claimed is:

1. A structure for assembling a flat display having a flat display module for displaying images with a case for fitting the flat display module therein, the structure comprising:

a plurality of joining parts formed at a rear surface of the flat display module; and a plurality of conformable joining parts integrally formed in the case in conformity with the joining parts of the flat display module, the plurality of joining parts being engaged with the plurality of joining parts in a fit manner and the rear surface of the display module is in direct contact with an opposing surface of the case from which the plurality of conformable joining parts are arranged upon.

2. The structure according to claim 1, wherein the joining parts of the flat display module are formed adjacent edges of the rear surface of the flat display module.

3. The structure according to claim 1, wherein each of the joining parts of the flat display module is a recess, and each of the conformable joining parts of the case is a protrusion inserted into and fit to the corresponding recess.

4. The structure according to claim 3, wherein the joining parts of the flat display module are formed adjacent edges of the rear surface of the flat display module.

5. The structure according to claim 1, wherein each of joining parts of the flat display module is a recess formed along a side surface of the flat display module, and each of the conformable joining parts of the case is a hook engaged with the corresponding recess.

6. A flat display device, comprising:

a flat display module for display images, the flat display module including a plurality of first joining parts on a rear surface; and a case that houses the flat display module, the case having a plurality of second joining parts integrally formed in the case and engaged with the first joining parts to secure the flat display module to the case, the first joining parts and the second joining parts being configured to enable repeated attachment and detachment of the flat display module relative to the case, the rear surface of the display module is in direct contact with an opposing surface of the case from which the plurality of second joining parts are arranged upon.

7. The flat display device according to claim 6, wherein each of the first joining parts of the flat display module is a recess on a rear surface of the flat display module, and each of the second joining parts of the case is a protrusion inserted into and fit to the corresponding recess.

8. The flat display device according to claim 6, wherein each of the first joining parts of the flat display module is a recess formed along a side surface of the flat display module, and each of the second joining parts of the case is a hook engaged with the corresponding recess.

9. The flat display device according to claim 6, wherein the case includes a front frame.

10. The flat display device according to claim 6, wherein the case includes a rear cover.

11. The flat display device according to claim 6, wherein the case includes a front frame and a rear cover.

12. A flat display device, comprising:
   a flat display module for displaying images, the flat display module including a plurality of first joining parts on a rear surface; and
   a case having a plurality of second joining parts integrally formed in the case and for housing the flat display module, the second joining parts being in frictional engagement with the corresponding first joining parts of the flat display module, enabling repeated attachment and detachment of the flat display module relative to the case, the rear surface of the display module is in direct contact with an opposing surface of the case from which the plurality of second joining parts are arranged upon.

13. The flat display device according to claim 12, wherein each of the first joining parts of the flat display module is a recess on a rear surface of the flat display module, and each of the second joining parts of the case is a protrusion inserted into and fit to the corresponding recess.

14. The flat display device according to claim 12, wherein each of the first joining parts of the flat display module is a recess formed along a side surface of the flat display module, and each of the second joining parts of the case is a hook engaged with the corresponding recess.

15. The flat display device according to claim 12, wherein the case includes a front frame.

16. The flat display device according to claim 12, wherein the case includes a rear cover.

17. The flat display device according to claim 12, wherein the case includes a front frame and a rear cover.

* * * * *